United States Patent [19]

Ito

[11] Patent Number: 5,019,684
[45] Date of Patent: May 28, 1991

[54] WIRE DISCONNECTION POSITION DETECTING APPARATUS

[75] Inventor: Masaya Ito, Fussa, Japan
[73] Assignee: Fanuc Ltd., Yamanashi, Japan
[21] Appl. No.: 444,132
[22] PCT Filed: Apr. 27, 1989
[86] PCT No.: PCT/JP89/00450
 § 371 Date: Nov. 29, 1989
 § 102(e) Date: Nov. 29, 1989
[87] PCT Pub. No.: WO89/10816
 PCT Pub. Date: Nov. 16, 1989

[30] Foreign Application Priority Data
May 11, 1988 [JP] Japan .................. 63-112600

[51] Int. Cl.⁵ .................. B23H 7/02; B23H 7/10
[52] U.S. Cl. .................. 219/69.12
[58] Field of Search ............... 219/69.12, 69.13, 69.17, 219/69.19; 226/11, 49, 50, 51; 204/224 M

[56] References Cited

U.S. PATENT DOCUMENTS

| | | | |
|---|---|---|---|
| 4,116,551 | 9/1978 | Kim et al. | 226/49 |
| 4,298,781 | 11/1981 | Inoue | 219/69.12 |
| 4,412,118 | 10/1983 | Nomura et al. | 219/69.12 |
| 4,414,457 | 11/1983 | Nomura et al. | 219/69.12 |
| 4,689,457 | 8/1987 | Izumiya et al. | 219/69.12 |

FOREIGN PATENT DOCUMENTS

| | | |
|---|---|---|
| 57-13125 | 1/1982 | Japan . |
| 167717 | 8/1985 | Japan .................. 219/69.12 |
| 60-52893 | 11/1985 | Japan . |
| 62-9827 | 1/1987 | Japan . |
| 62-63018 | 3/1987 | Japan . |
| 62-16771 | 4/1987 | Japan . |
| 114821 | 5/1988 | Japan .................. 219/69.12 |
| 2122747 | 1/1984 | United Kingdom ............ 219/69.19 |

*Primary Examiner*—Geoffrey S. Evans
*Attorney, Agent, or Firm*—Staas & Halsey

[57] ABSTRACT

A wire disconnection position detecting apparatus of a wire feed path in which wire disconnection is caused and the causes of the disconnection in this section set in advance. Upon disconnection of a wire, as a voltage for disconnection position detection applied to the wire through a conductor is detected by a microprocessor through an electrode disposed on the lower-course side of the conductor (S3), the value in a register for rewinding amount storage is updated, with rewind of the wire by a rewinding motor, in accordance with pulses delivered from a rotary encoder (S4, S5), and thereafter, the rotation of the motor and the application of the voltage are stopped when a cut end of the wire passes the electrode (S6 to S8). Based on the result of comparison between a detected rewinding amount and the distances between the electrode and individual parts arranged along the wire feed path, the microprocessor detects the section of the wire feed path in which the wire is snapped (S9), and displays the wire disconnection section and the causes of the disconnection in this section, in the form of messages, on a CRT screen (S10).

8 Claims, 3 Drawing Sheets

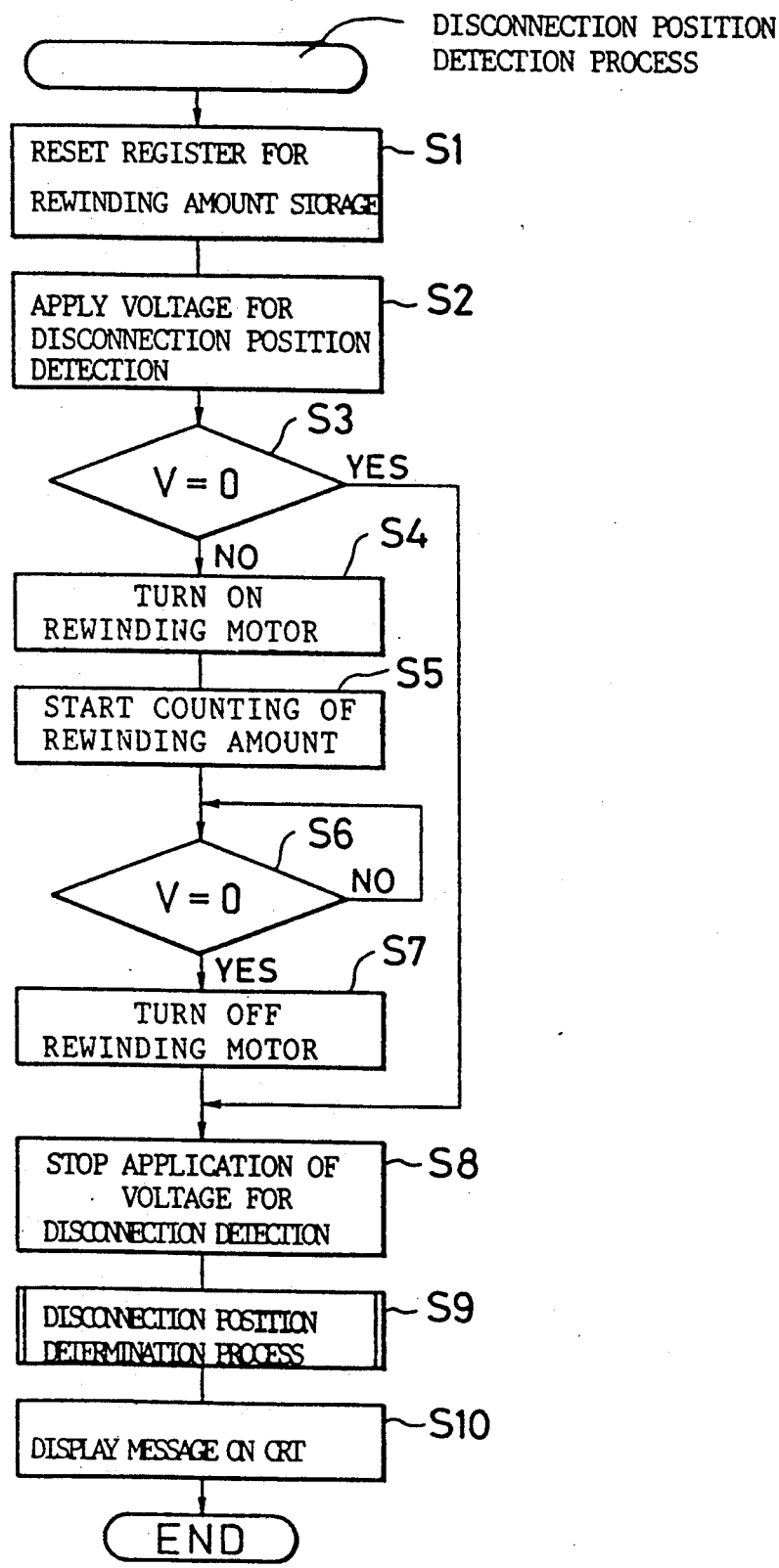

WIRE DISCONNECTION POSITION DETECTING APPARATUS

TECHNICAL FIELD

The present invention relates to a wire disconnection position detecting apparatus in a wire-cut electric discharge machine.

Background Art

A typical wire-cut electric discharge machine is constructed so that electric discharge machining is stopped to effect wire connection automatically when wire disconnection is detected by means of a limit switch, which is disposed along a feed path for a wire electrode (hereinafter referred to as wire) and operates in response to reduction of wire tension or suspension of the travel of the wire caused by the wire disconnection, whereupon the electric discharge machining is restarted. Depending on the types of the causes of the wire disconnection, however, the wire may possibly snap again immediately after the restart of the electric discharge machining. In such a case, purposeless connection work is repeated, so that the machining efficiency is lowered, and a workpiece suffers streaky flaws on its surface with every disconnection of the wire. Thus, the quality of machined products is lowered.

DISCLOSURE OF THE INVENTION

The object of the present invention is to provide a wire disconnection position detecting apparatus of a wire-cut electric discharge machine, capable of detecting and displaying a wire disconnection position in order to clear up the causes of wire disconnection.

In order to achieve the above object, a wire disconnection position detecting apparatus according to the present invention comprises means for detecting disconnection of a wire electrode; means for rewinding the snapped wire electrode in the direction opposite to the feeding direction of the wire electrode so that a cut end of the wire electrode passes a predetermined position on a wire electrode feed path; means for detecting the rewinding amount of the wire electrode; and means for displaying a wire disconnection position in accordance with the rewinding amount of the wire electrode thus detected.

According to the present invention, the wire disconnection position is displayed in accordance with the rewinding amount of the wire electrode rewound so that the cut end passes the predetermined position on the wire electrode feed path. Accordingly, the causes of the disconnection can be easily cleared up in accordance with the displayed information, so that purposeless repetition of wire connecting work can be avoided. Thus, the machining efficiency and the quality of machined products can be improved.

BRIEF DESCRIPTION OF THE DRAWINGS

FIG. 3 is a flow chart showing a wire disconnection position detecting process executed by the control device of FIG. 2.

BEST MODE OF CARRYING OUT THE INVENTION

Figure 1:
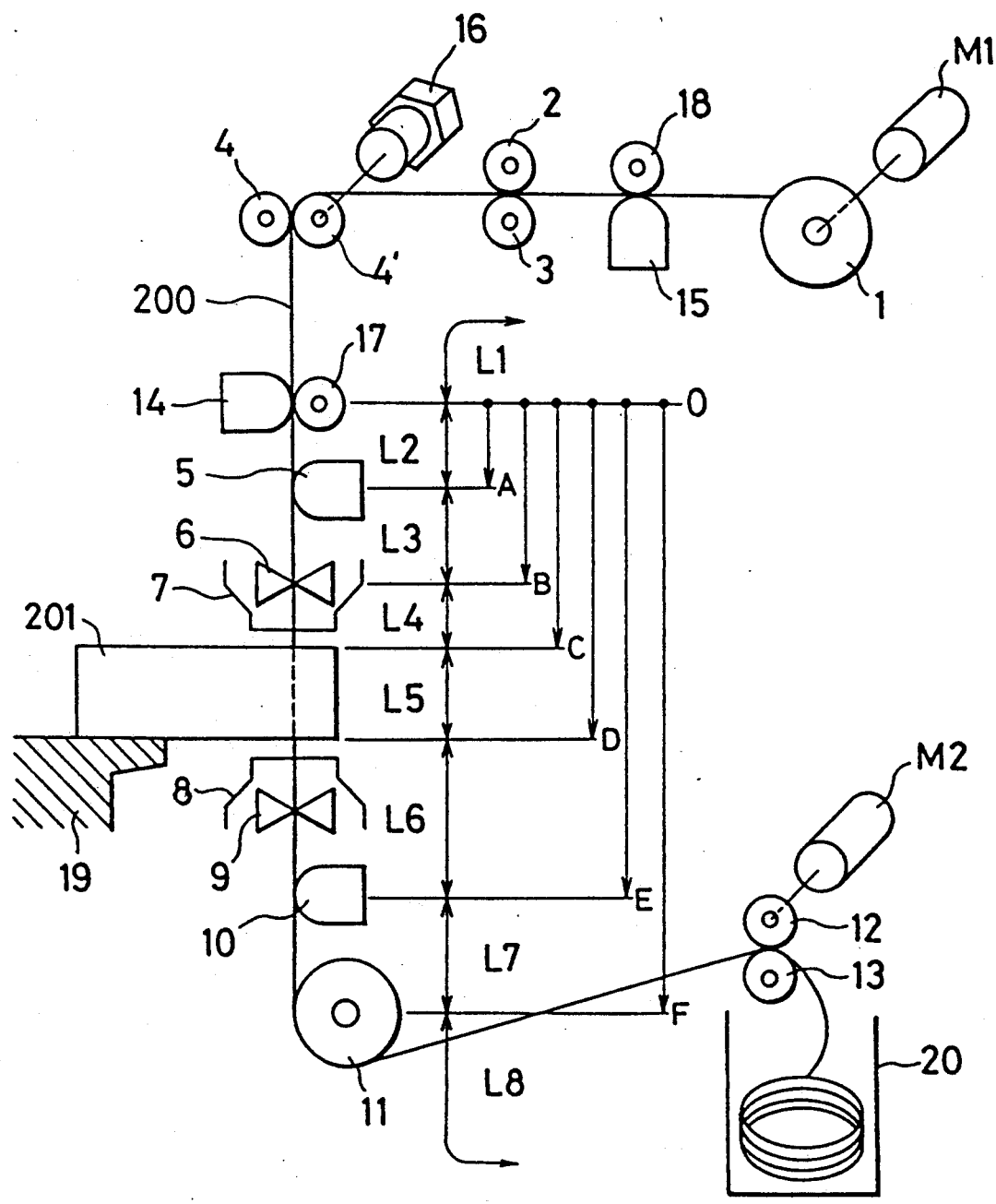
FIG. 1 is a schematic view showing the principal part of a wire-cut electric discharge machine according to one embodiment of the present invention.

In FIG. 1, a wire-cut electric discharge machine is constructed so that a workpiece 201 placed on a table 19 is subjected to electric discharge machining as a winding motor M2 is rotated to feed a wire electrode (hereinafter referred to as wire) 200 wound on a supply reel 1 from the reel 1 along a predetermined wire feed path. More specifically, the wire 200 fed from the reel 1 is delivered to pulleys 4 and 4' through a roller 2 of a disconnection detecting apparatus and a brake roller 3 of a tension generating device opposed to the roller 2. Subsequently, the wire 200 is delivered to a lower pulley 11 through an upper feeder 5, an upper wire guide 6, an upper nozzle 7, the workpiece 201, a lower nozzle 8, a lower wire guide 9, and a lower feeder 10. Then, the wire 200 is held between a winding roller 12 operatively connected to the motor M2 and a pinch roller 13 opposed to the roller 12, and is driven by both these rollers 12 and 13 which rotate accompanying the rotation of the motor M2, so that the wire is cast in a wire recovery box 20. In the meantime, electric power is supplied to the wire 200 from the upper and lower feeders 5 and 10, which are connected to a power supply unit 21 for machining (FIG. 2), whereby electric discharge is caused between the wire and the workpiece 201, and a machining fluid is supplied between the wire 200 and the workpiece 201 by injection from the upper and lower nozzles 7 and 8. The disconnection detecting apparatus is arranged to detect wire disconnection when the roller 2, which can rotate as the wire 200 travels, is stopped from rotating as the wire is stopped from traveling due to the wire disconnection. The tension generating device is arranged to apply a predetermined braking force to the brake roller 3 so that a predetermined wire draw-out resistance is applied to the wire 200 through the roller 3, thereby producing a tension in the wire.

The electric discharge machine further comprises a motor M1 for rotating the wire supply reel 1 in the clockwise direction of FIG. 1 to rewind the wire 200, an electrode 14 for disconnection position detection, a conductor 15 for supplying a voltage for disconnection position detection, and a detector 16 for detecting the rewinding amount of the wire. The electrode 14 is located at a predetermined position on the upper-course side of the wire feed path where wire disconnection cannot be easily caused, e.g., between the upper feeder 5 and the pulleys 4 and 4', so that the wire 200 is slidably held between the electrode 14 and a pulley 17 opposed thereto. The conductor 15 is disposed at a predetermined position on the upper-course side of the electrode 14, with respect to the wire feed path, for example, between the wire supply reel 1 and the rollers 2 and 3 of the disconnection detecting apparatus and the tension generating device, so that the wire 200 is slidably held between the conductor 15 and a pulley 18 opposed thereto. The rewinding amount detector 16, which is composed of a rotary encoder or the like, has a rotary shaft rotatable in unison with the pulley 4', which is disposed on the upper-course side of the electrode 14 and rotates as the wire 200 travels, so as to generate a pulse every time the rotary shaft rotates for a predetermined angle.

Figure 2:
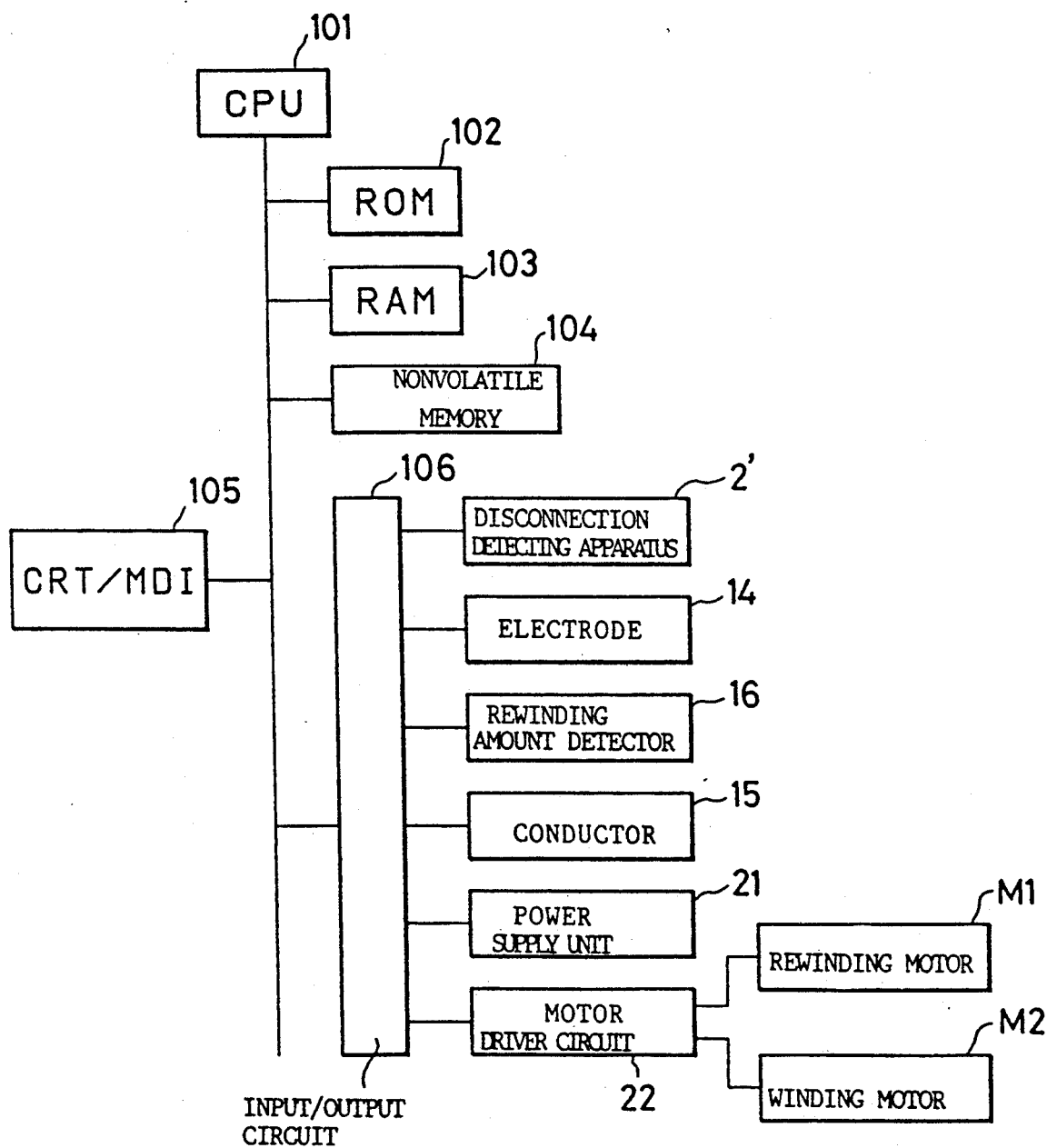
FIG. 2 is a block diagram showing a numerical control device of the electric discharge machine of FIG. 1.

The electric discharge machine further comprises a numerical control device shown in FIG. 2, which includes a microprocessor (hereinafter referred to as CPU) 101 containing a register for storing the rewinding amount. The CPU 101 is bus-connected with a ROM 102 stored with a control program, a RAM 103 utilized for the storage of various set values and temporary storage for data processing, a nonvolatile memory 104 stored with a table for a disconnection position detection process mentioned later, a manual data input device with CRT display unit (hereinafter referred to as CRT/MDI) 105, and an input/output circuit 106. The input/output circuit 106 is connected with the disconnection detecting apparatus 2', the electrode 14, the conductor 15, the rewinding amount detector 16, and the power supply unit 21 for machining, and is also connected with the motors M1 and M2 through a motor driver circuit 22.

Based on an understanding of the inventor hereof that there is the following correlation between a disconnection region on the wire feed path and the main causes of disconnection in that region, the nonvolatile memory 104 is provided with the table for storing disconnection positions and the causes of disconnection in the form of simple messages, corresponding individually to first to eighth sections L1 to L8 (FIG. 1) set along the wire feed path. Here the first section L1 indicates that region of the wire feed path on the upper-course side of the electrode 14, the second to seventh sections L2 to L7 each indicate a wire feed path region between each corresponding pair of elements, including the electrode 14, the upper feeder 5, the upper wire guide 6, the upper surface of the workpiece 201, the lower surface of the workpiece, the lower feeder 10, and the lower pulley 11, and the eighth section L8 indicates that region of the wire feed path on the lower-course side of the lower pulley 11.

The main causes of disconnection at the first and second sections L1 and L2 include malfunction of a wire drive system and a shortage of wire supply, while the causes of disconnection at the third section L3 include wrong positioning of the upper feeder 5 and flaws and dirt on a wire sliding surface thereof. Further, the causes of disconnection at the fourth section L4 include malfunction of the upper wire guide 6 and insufficient flow rate of the machining fluid supplied through the upper nozzle 7, the causes of disconnection at the fifth section L5 include unsuitable machining conditions, insufficient wire feed speed, and insufficient flow rate of the machining fluid supplied, and the causes of disconnection at the sixth section L6 include insufficient flow rate of the machining fluid supplied through the lower nozzle 8 and malfunction of the lower wire guide 9. Furthermore, the causes of disconnection at the seventh section L7 include wrong positioning of the lower feeder 10 and flaws and dirt on a wire sliding surface thereof, and the causes of disconnection at the eighth section L8 include malfunction of the wire drive system and insufficient wire feed speed.

In order to facilitate a disconnection position discrimination process mentioned later, moreover, the nonvolatile memory 104 is previously stored with first to sixth distances A to F on the wire feed path, from the electrode 14 to the upper feeder 5, the upper wire guide 6, the upper surface of the workpiece 201, the lower surface of the workpiece, the lower feeder 10, and the lower pulley 11, respectively. In connection with the second distance B, since the upper wire guide 6 moves within a horizontal plane during tapering work, the CPU 101 performs corrective operation for the second distance B, if necessary, in accordance with the position of the upper wire guide 6 with respect to a reference point (origin of a machine coordinate system set for the electric discharge machine), during the disconnection position discrimination process. In connection with the third distance C as a function of the thickness of the workpiece 201, furthermore, the workpiece thickness is manually inputted by means of the CRT/MDI 15 before the start of the machining.

The following is a description of the operation of the electric discharge machine of FIG. 1.

If the wire 200 snaps during the electric discharge machining, the winding-direction driving force of the rollers 12 and 13, which are driven by the winding motor M2, is not applied to the upper-course half of the snapped wire (hereinafter referred to as snapped wire), so that this wire half stops from traveling. Detecting this, the disconnection detecting apparatus 2' delivers a disconnection detection signal. In response to the disconnection detection signal supplied through the input-/output circuit 106, the CPU 101 stops the operation of the power supply unit 21 for machining, thereby interrupting the electric discharge machining. Preferably, at the same time, an alarm unit (not shown) is driven to give an alarm, thereby informing an operator of the occurrence of wire disconnection. The lower-course half of the snapped wire 200 is cast in the wire recovery box 20.

Then, the CPU 101 starts the disconnection position detection process of FIG. 3. First, the built-in register for rewinding amount storage is reset to "0" (Step S1), and a DC voltage of several volts for disconnection position detection from a power source (not shown) is applied to the wire 200 through the conductor 15 (Step S2), so that a voltage of a predetermined level is detected through the electrode 14 when the cut end of the snapped wire is within that region of the wire feed path on the lower-course side of the electrode 14. Then, the CPU determines whether the voltage V detected through the electrode 14 is 0 volt (Step S3). If the decision is negative, that is, if it is concluded that the cut end of the wire 200 is within the wire feed path region on the lower side of the electrode 14, the CPU 101 causes the motor driver circuit 22 to drive the rewinding motor M1 in a rewinding direction, thereby rotating the wire supply reel 1 in the direction opposite to the normal direction (Step S4).

Thus, as the snapped wire 200 travels in the rewinding direction, the rotary shaft of the rewinding amount detector 16 rotates in unison with the pulley 4', and the CPU 101 starts counting the pulses which are each delivered from the detector 16 every time the rotary shaft rotates for the predetermined angle (Step S5). Then, the CPU 101 determines whether the voltage detected through the electrode 14 is 0 volt (Step S6). If the decision is negative, that is, if it is concluded that the wire is not rewound yet to an extent such that the electrode 14 is passed by the cut end of the snapped wire 200, the CPU 101 continues counting the output pulses of the detector 16, and repeatedly makes the decision of Step S6 while updating the value in the register for rewinding amount storage every time it counts one pulse.

If the decision of Step S6 is positive, that is, if it is concluded that the wire is rewound so that the electrode 14 is passed by the cut end, thereafter, the application of the voltage for disconnection detection to the wire 200 through the conductor 15 is stopped (Step S8), whereupon the program proceeds to the disconnection position discrimination process (Step S9). If a voltage of 0 volt is detected in Step S3 despite the application of the voltage for disconnection detection in Step S2, the program proceeds directly to Step S9 without the execution of Steps S4 to S7, since the wire cut end is already on the upper-course side of the location of the electrode 14.

In the process of Step S9 to detect that section, among the first to eighth sections L1 to L8, in which the wire 200 is snapped, the CPU 101 first determines whether the stored value in the register for rewinding amount storage is "0." If the stored value is "0," it is concluded that the wire is snapped in the first section L1. If the stored value is not "0," on the other hand, the rewinding amount (distance between the disconnection position and the electrode 14) stored in the aforesaid register is compared successively with the first to sixth distances A to F previously stored in the nonvolatile memory 104, whereby that section, among the second to eighth sections L2 to L8, in which the wire 200 is snapped is detected. If the stored value in the register is smaller than the value for the first distance A, for example, it is concluded that the wire 200 is snapped in the second section L2.

Subsequently, the CPU 101 reads out messages, indicative of the disconnection position corresponding to the disconnection section detected in Step S9 and the causes of the disconnection, from the table of the nonvolatile memory 104, and causes the CRT/MDI 105 to display the read messages on its CRT screen (Step S10). If the wire snaps in the first or second section L1 or L2, for example, "DISCONNECTION ON THE UPPER-COURSE SIDE OF UPPER FEEDER 5" and "CHECK WIRE DRIVE SYSTEM FOR STATE AND RESIDUAL WIRE LENGTH." In accordance with the displayed messages, the operator examines the causes of the disconnection, and makes necessary repairs to remove the disconnection, and then restart the operation of the electric discharge machine. In consequence, the probability of the wire snapping again immediately after the restart of the operation can be considerably lowered. A description of the arrangement and function for the conventional automatic wire connection, which is made at the restart of the operation, is omitted herein.

What is claimed is:

1. A wire disconnection position detecting apparatus, comprising:
   means for detecting disconnection of a wire electrode;
   means for rewinding a snapped wire electrode in the direction opposite to the feeding direction of the wire electrode so that a cut end of the wire electrode passes a first predetermined position on a wire electrode feed path;
   means for detecting the rewinding amount of said wire electrode; and
   means for displaying a wire disconnection position in accordance with the rewinding amount of said wire electrode thus detected.

2. A wire disconnection position detecting apparatus according to claim 1, wherein said wire electrode rewinding means includes means for applying a voltage for disconnection position detection to said wire electrode and means for detecting said applied voltage at said first predetermined position, said voltage applying means being disposed in a second predetermined position on the upper-course side of said first predetermined position, on said wire electrode feed path, whereby the rewinding of said wire electrode is stopped when said applied voltage ceases to be detected.

3. A wire disconnection position detecting apparatus according to claim 1, wherein said display means displays said wire disconnection position and the causes of the disconnection at said disconnection position.

4. A wire disconnection position detecting apparatus according to claim 1, wherein said rewinding amount detecting means includes means for generating a pulse every time said wire electrode is rewound for a predetermined amount by said rewinding means, and means for counting said generated pulses.

5. An electric discharge machine in combination with a wire disconnection detection apparatus, comprising:
   means for detecting disconnection of a wire electrode;
   means for rewinding a snapped wire electrode in the direction opposite to the feeding direction of the wire electrode so that a cut end of the wire electrode passes a first predetermined position on a wire electrode feed path;
   means for detecting the rewinding amount of said wire electrode; and
   means for displaying a wire disconnection position in accordance with the rewinding amount of said wire electrode thus detected,
   wherein said apparatus is mounted on said wire-cut electric discharge machine which includes a power supply unit for machining and a feeder for connecting said power supply unit for machining to said wire electrode, and said first predetermined position is set on the upper-course side of the location of said feeder.

6. An electric discharge machine in combination with a wire disconnection detection apparatus, comprising:
   means for detecting disconnection of a wire electrode;
   means for rewinding a snapped wire electrode in the direction opposite to the feeding direction of the wire electrode so that a cut end of the wire electrode passes a first predetermined position on a wire electrode feed path;
   means for detecting the rewinding amount of said wire electrode; and
   means for displaying a wire disconnection position in accordance with the rewinding amount of said wire electrode thus detected,
   wherein said wire disconnection position detecting apparatus is mounted on said wire-cut electric discharge machine which has a plurality of operating parts arranged at distances from one another along said wire electrode feed path so that each two adjacent operating parts define one of a plurality of sections of the wire electrode feed path, and said apparatus further includes means for previously storing the distances between said first predetermined position and the respective locations of said operating parts, and said display means displays a section in which said wire electrode disconnection is caused, in accordance with the result of comparison between said rewinding amount of said wire electrode and said previously stored distances.

7. An electric discharge machine in combination with a wire disconnection position detection apparatus according to claim 6, wherein said wire-cut electric discharge machine has a power supply unit for machining, and said plurality of operating parts include upper and lower feeders for connecting said machining power supply unit to said wire electrode at positions above and below a workpiece, respectively, an upper wire guide and an upper nozzle arranged individually on the lower-course side of said upper feeder, at a position above said workpiece, and a lower wire guide and a lower nozzle arranged individually on the upper-course side of said lower feeder, at a position below said workpiece.

8. An electric discharge machine in combination with a wire disconnection position detecting apparatus according to claim 7, wherein said display means further includes means for previously storing the causes of disconnection at said individual sections, and displays the section in which said wire electrode is snapped and those causes of the disconnection, among said previously stored causes, which correspond to said section.

* * * * *